United States Patent [19]

Each et al.

[11] Patent Number: 5,445,670

[45] Date of Patent: Aug. 29, 1995

[54] ABRASIVE-CONTAINING SURFACE-FINISH COMPOSITION

[75] Inventors: Thomas C. Each, Orange; Mohammad Nilchian, Woodland Hills, both of Calif.

[73] Assignee: Blue Coral, Inc., Cleveland, Ohio

[21] Appl. No.: 255,782

[22] Filed: Jun. 8, 1994

[51] Int. Cl.$^6$ .............................. C09G 1/02; C09G 1/16
[52] U.S. Cl. ............................................ 106/3; 106/10; 106/36
[58] Field of Search ........................... 106/3, 10, 36

[56] References Cited

U.S. PATENT DOCUMENTS

| | | | |
|---|---|---|---|
| 3,544,498 | 12/1970 | Holdstock et al. | 106/3 |
| 3,929,492 | 12/1975 | Chapman et al. | 106/3 |
| 4,218,250 | 8/1980 | Kasprzak | 106/3 |
| 4,358,295 | 11/1982 | Namba et al. | 106/3 |
| 4,704,429 | 11/1987 | Hackett et al. | 524/560 |
| 4,778,524 | 10/1988 | Chapin | 106/10 |
| 4,846,887 | 7/1989 | Kuehnle | 106/31 |
| 4,859,359 | 8/1989 | De Matteo et al. | 252/174.15 |
| 5,055,132 | 10/1991 | Fernandez et al. | 106/11 |

OTHER PUBLICATIONS

Emulsion Systems Inc., Material Safety Data Sheet for "Esi-Cryl 252", Dec. 5, 1991.
Emulsion Systems Inc., Material Safety Data Sheet for "Esi-Cryl 325", Mar. 22, 1991.

*Primary Examiner*—Helene Klemanski
*Attorney, Agent, or Firm*—Renner, Otto, Boisselle & Sklar

[57] ABSTRACT

This invention relates to an abrasive-containing surface-finish composition, comprising: an effective amount of abrasive particulates to enhance the non-slip characteristics of said composition, said abrasive particulates having an average particle size of up to about 100 microns. The surface finish-composition can be water-based or oil-based. In one embodiment the surface-finish composition further comprises water, at least one acrylic polymer and at least one synthetic wax. Optional ingredients include one or more alkali-soluble resins, leveling agents, water-soluble solvents, plasticizers, defoaming agents, fragrance enhancers, biocides, and the like. These compositions are useful as anti-slip floor finishes.

21 Claims, No Drawings

ABRASIVE-CONTAINING SURFACE-FINISH COMPOSITION

TECHNICAL FIELD

This invention relates to abrasive-containing surface-finish compositions. More particularly, this invention relates to floor-finish compositions and the like which contain abrasive particulates having average particle sizes of up to about 100 microns. These compositions are useful as anti-slip surface finish compositions.

BACKGROUND OF THE INVENTION

In order to preserve and protect floors and the like, surface maintenance procedures are instituted. Surface maintenance procedures may include cleaning, polishing, finishing and the like. A surface finish composition is typically applied to a clean surface. Specifically, a surface finish composition may be applied to a substrate and converted to a solid film or dried film finish, primarily by evaporation. The surface finish composition not only enhances the appearance of the substrate but provides surface protection because the composition contains components that leave a glossy protective film coating over the substrate.

Surface finish compositions, however, are not without their problems. One problem associated with conventional surface finish compositions is a relatively low safety factor because they tend to be slippery. As a result, substrates such as floors and the like covered with conventional surface finish compositions cause frequent slip and fall accidents. Slip and fall accidents, in turn, bring about increased liability costs and higher insurance premiums. More importantly, these accidents frequently cause bodily injury.

Therefore, it would be advantageous to provide a surface finish composition with enhanced non-slip characteristics. It would be advantageous if this composition also possessed other desirable characteristics such as glossy appearance, adequate surface protection, and the like. The present invention fulfills these needs.

SUMMARY

This invention relates to an abrasive-containing surface-finish composition, comprising: an effective amount of abrasive particulates to enhance the non-slip characteristics of said composition, said abrasive particulates having an average particle size of up to about 100 microns. The surface finish-composition can be water-based or oil-based. In one embodiment the surface-finish composition further comprises water, at least one acrylic resin and at least one synthetic wax. Optional ingredients include one or more alkali-soluble resins, leveling agents, water-soluble solvents, plasticizers, defoaming agents, fragrance enhancers, biocides, and the like. These compositions are useful as anti-slip floor finishes.

DESCRIPTION OF THE PREFERRED EMBODIMENTS

The inventive abrasive-containing surface-finish compositions can be water-based compositions or oil- (or wax-) based compositions. When applied to a substrate and converted to a solid or dry film finish, these compositions provide the substrate with enhanced non-slip (or non-skid) characteristics. That is, the coefficient of friction for the solid or dry film finish is higher than what it would be if the corresponding finish did not contain the abrasive particulates required by this invention. These surface finish compositions also provide other desirable characteristics such as glossy appearance, adequate surface protection, and the like.

The abrasive particulates can be any mineral particulate that does not dissolve in the inventive compositions and provides the dry film finish coatings with enhanced non-slip characteristics. Examples of useful abrasive particulates include crystalline silica, aluminum silica, titanium oxide (e.g., titanium sesquioxide, titanium dioxide, titanium trioxide), zinc oxide, aluminum oxide, topaz, silicon carbide, boron nitride, or mixtures of two or more thereof. In one embodiment, these particulates are characterized by a Knoop scale hardness of at least about 500, or at least about 1000, or at least about 1500, or at least about 2000. The average particle size of these abrasive particles is up to about 100 microns, and in one embodiment from about 0.5 micron up to about 100 microns, or about 1 micron up to a U.S. Sieve Series Number of about 200 (about 74 microns), or from about 1 micron up to a Sieve Number of about 325 (about 44 microns), or from about 1 to about 40 microns, or from about 1 to about 20 microns. In one embodiment the average particulate size of the abrasive is from about 0.5 to about 10 microns, or from about 1 to about 8 microns, or from 1 to about 5 microns, or from about 1 to about 3 microns, or from about 1.2 to about 2.2 microns.

In one embodiment the abrasive particulate is aluminum oxide having a Knoop scale hardness number of at least about 1500, preferably at least about 2000, and an average particle size of up to about 40 microns, preferably up to about 20 microns, more preferably up to about 10 microns. In an advantageous embodiment the aluminum oxide abrasive particulates have an average particle size in the range of about 0.5 to about 10 microns, preferably about 1 to about 8, more preferably about 1 to abut 5, more preferably about 1 to about 3, more preferably about 1.2 to about 2.2 microns. In one embodiment Mirox-PL (a product of Bernatex Corporation, a.k.a. Bonded Oxides Corporation, having a place of business at 63 Middlesex Street, P.O. box 905, North Chelmsford, Mass. 01863, identified as aluminum oxide abrasive particulate having an average particle size of 1.2 to 2.2 microns) is useful as the abrasive particulate.

The abrasive particulates are present in the inventive compositions at sufficient levels so as to not substantially alter the glossy appearance or the protective characteristics of such compositions (especially floor finish coating compositions) when applied to a substrate, and yet provide such compositions with the desired non-slip properties. In one embodiment the abrasive particulates are present in the inventive compositions at concentrations of about 0.2% to about 2% by weight, and in one embodiment about 0.7% to about 1.8% by weight, and in one embodiment about 1% to about 1.5% by weight.

The acrylic polymer can be any acrylic polymer that can be dispersed or emulsified in water. These include the polymers and copolymers of acrylic or methacrylic acids or esters. The acrylates may be methyl, ethyl, butyl or 2-ethylhexyl. The methacrylates may be methyl, ethyl, butyl, lauryl or stearyl. Examples include acrylic polymers and copolymers, zinc-free acrylic polymers and copolymers, styrene-acrylic copolymers, urethane-acrylic copolymers, vinyl acetate-acrylic copolymers, and the like. An example of a useful acrylic polymer is the acrylic polymer in an intermediate product supplied by Rohm & Haas (hereinafter "Intermediate R&H") which is identified as an acrylic polymer emulsion having an acrylic polymer content of 37–39% by weight, a water content of 61–63% by weight, a residual monomer content of <0.1% by weight, a maximum ammonia content of 0.2% by weight, a pH of 8.7–9.3, a maximum viscosity of 100 centipoise, and a specific gravity of 1–1.2. Typically the acrylic polymers are present in the inventive compositions at concentrations in the range of about 1% to about 25% by weight, and in one embodiment about 5% to about 20% by weight, and in one embodiment from about 10% to about 18% by weight.

The wax can be any synthetic wax that can be dispersed, dissolved or emulsified in water. These waxes include the polyalkylenes such as polyethylene, polypropylene, polybutene, polyisobutylene, and the like. In one embodiment, it is useful to employ solutions or emulsions of such waxes. The waxes identified in McCutcheon's "Functional Materials," 1992, North American Edition, at pp. 285–290 can be used, these pages being incorporated herein by reference. Commercially available waxes that are useful include Esi Cryl 43, Esi Cryl 252 and Esi Cryl 325, each of which are identified as being polyethylene wax emulsions available from Emulsion Systems Inc. of Valley Stream, N.Y. Mixtures of two or more of the foregoing synthetic waxes can be used. Typically these waxes are present in the inventive compositions at concentrations in the range of about 0.5% to about 10% by weight, and in one embodiment about 1% to about 8% by weight, and in one embodiment from about 2% to about 5% by weight.

The alkali-soluble resin can be any carboxyl-containing resin that is soluble in an alkaline aqueous solution. In one embodiment these resins are soluble in water to the extent of at least about one gram per liter of water at 25° C. Examples of such resins include carboxyl-containing alkylene resins (e.g., carboxyl-containing polyethylene, polypropylene, polybutylene, polyisobutylene, etc., as well as carboxyl-containing copolymers containing units of ethylene, propylene, butylene, isobutylene, etc.), styrene maleic anhydride copolymers, styrene acrylic acid copolymers, pentaerythritol-based carboxyl-containing resins, rosin-based resins, and the like. In one embodiment the alkali-soluble resin is other than any of the above-described acrylic resins. In one embodiment the alkali-soluble resin is a maleated rosin ester resin, a specific example of which is the resin contained in Resinall 802, which is available from Resinall Corporation and identified as a resin solution. Mixtures of two or more of the foregoing alkali-soluble resins can be used. Typically these alkali-soluble resins are present in the inventive compositions at concentrations in the range of up to about 5% by weight, and in one embodiment from about 0.2% to about 5% by weight, and in one embodiment from about 1.6% to about 3% by weight, and in one embodiment from about 1.6% to about 2.5% by weight.

The leveling agent can be any additive that enhances the ability of the inventive finish composition to flow out after application so as to obliterate any surface irregularities such as applicator marks, peaks, craters, and the like which are produced by the mechanical process of applying the finish coating. Many leveling agents are available. See, for example, McCutcheon's "Emulsifiers and Detergents," 1992, North American Edition, pp. 1–209, these pages being incorporated herein by reference. Examples include fluorocarbon leveling agents such as the fluorinated alkyl quaternary ammonium iodides, fluorinated alkyl polyoxyethylene ethanols, fluorinated alkyl alkoxylates, potassium fluorinated alkyl carboxylates, and the like. Examples of commercially available leveling agents include those available from 3M Company under the names Fluorad FC-129 (potassium fluorinated alkyl carboxylate), Fluorad FC-135 (fluorinated alkyl quaternary ammonium iodide), Fluorad FC-170-C (fluorinated alkyl polyoxyethylene ethanol) and Fluorad FC-171 (fluorinated alkyl alkoxylate) and the fluorochemical surfactants sold under the tradename Zonyl and available from E.I dupont De Nemours & Co. Mixtures of two or more of the foregoing leveling agents can be used. Typically these leveling agents are present in the inventive compositions at concentrations in the range of up to about 0.03% by weight, and in one embodiment about 0.001% to about 0.03% by weight, and in one embodiment from about 0.01% to about 0.02% by weight.

The water-soluble solvent can be any solvent for the above-described acrylic polymers and/or waxes that is soluble in water. The acrylic polymers and waxes are preferably soluble in these water-soluble solvents to the extent of at least about one gram of polymer or wax per liter of solvent at 25° C. The water-soluble solvent is preferably soluble in water to the extent of at least about one gram of solvent per liter of water at 25° C. In one embodiment the water-soluble solvent is at least one glycol ether. Examples of useful water-soluble solvents include the alkylene glycol ethers such as ethylene glycol monomethyl ether, ethylene glycol monohexyl ether, ethylene glycol monoethyl ether, ethylene glycol mono-n-butyl ether, diethylene glycol monomethyl ether, diethylene glycol mono-n-butyl ether, propylene glycol monomethyl ether, dipropylene glycol monomethyl ether, tripropylene glycol monomethyl ether, ethylene glycol monoisobutyl ether, diethylene glycol monoisobutyl ether, propylene glycol monoisobutyl ether, ethylene glycol monophenyl ether, propylene glycol monophenyl ether, ethylene glycol monomethyl ether acetate mixtures of the foregoing, and the like. Examples of commercially available water-soluble solvents that are useful include methyl Carbitol (product of Union Carbide identified as diethylene glycol monomethyl ether) and methyl Cellosolve (product of Union Carbide identified as ethylene glycol monomethyl ether). Mixtures of two or more of the foregoing water-soluble solvents can be used. Typically these water-soluble solvents are present in the inventive compositions at concentrations in the range of up to about 10% by weight, and in one embodiment from about 0.4% to about 10% by weight, and in one embodiment from about 2% to about 8% by weight.

The plasticizer can be any additive that softens the film or coating that is formed when the inventive composition is applied to a substrate. These plasticizers provide such films or coatings with enhanced flexibility and formability characteristics. Examples of such plasticizers include tributoxyethyl phosphate, butylbenzylphthalate, dimethyl phthalate, dibutyl phthalate, triphenyl phosphate and tributyl phosphate. Mixtures of two or more of the foregoing plasticizers can be used. Typically these plasticizers are present in the inventive compositions at concentrations in the range of up to about 5% by weight, and in one embodiment about 0.8% to about 5% by weight, and in one embodiment from about 1% to about 2% by weight.

The defoaming agent can be any defoaming agent that inhibits the development of foam when the inventive composition is mixed. Many defoaming agents are known. See, for example, McCutcheon's "Functional Materials," 1992, North American Edition, pp. 91–114, these pages being incorporated herein by reference. Silicone defoamers are preferred. In one embodiment the defoaming agent is a dimethyl polysiloxane compound. Specific examples of antifoam agents are SWS 211, SWS-213 and SWS-214 available from Wacker Silicones Corporation of Adrian Mich. The defoaming agents are present in the inventive compositions in minor amounts sufficient to provide such compositions with enhanced defoaming properties. In one embodiment the defoaming agent is present in the inventive composition at a concentration in the range of up to about 0.1% by weight, and in one embodiment about 0.01% to about 0.08% by weight.

In one embodiment the inventive composition may contain an effective amount of a fragrance enhancer. Any fragrance enhancer known in the surface finishing art may be used. In one embodiment the fragrance enhancer is Alpine 9697 which is fresh spice compounded fragrance available from Alpine Aromatics International of Piscataway, N.J. Mixtures of two or more fragrance enhancers can be used. Typically these fragrance enhancers are present in the inventive compositions at concentrations in the range of up to about 0.1% by weight, and in one embodiment from about 0.01% to about 0.03% by weight, and in one embodiment from about 0.01% to about 0.02% by weight.

The biocidal agent can be any biocide that inhibits the growth of undesirable biological organisms in the inventive compositions. These include algicides, antimicrobials, bactericides, fungicides, and the like. Many biocides are known. See, for example, McCutcheon's "Functional Materials," 1992, North American Edition, pp. 2–11, these pages being incorporated by reference. Formaldehyde and the alkyl (methyl, ethyl, propyl, butyl) esters of para-hydroxybenzoic acid are useful. An example of a commercially available biocide that is useful is Kathon CG/ICP which is a product of Rohm & Haas identified as 5-chloro-2-methyl-4-isothiazolin-3-one. The biocidal agents are optional ingredients but when used are present in the inventive compositions in minor amounts sufficient to provide such compositions with enhanced antibiocidal properties. In one embodiment the biocidal agents are present in the inventive compositions at concentrations up to about 0.1% by weight, and in one embodiment about 0.01% to about 0.1% by weight, and in one embodiment about 0.015 to about 0.05% by weight, and in one embodiment about 0.03% to about 0.05% by weight.

The inventive compositions can be provided as concentrates or fully formulated finish coating compositions. The fully-formulated water-based compositions can have water contents in the range of up to about 90% by weight. These compositions may have water contents in the range of about 10% to about 90% by weight, and in one embodiment from about 15% to about 60% by weight, and in one embodiment from about 20% to about 40% by weight. With the concentrates the ingredients other than water are provided in the same ratios to each other as with the fully formulated water-based compositions but the water content is reduced or eliminated for the purpose of reducing shipping costs and the like. The water content of these concentrates is generally up to about 20% by weight, and in one embodiment in the range of about 5% to about: 20% by weight.

In one embodiment, the inventive composition comprises an abrasive-containing surface-finish composition, comprising: about 10% to about 90% by weight water, about 1% to about 25% by weight of at least one acrylic polymer, about 0.5% to about 10% by weight of at least one synthetic wax, about 0.2% to about 5% by weight of at least one alkali-soluble resin, about 0.4% to about 10% by weight of at least one water-soluble solvent, about 0.8% to about 5% by weight of at least one plasticizer, about 0.001% to about 0.03% by weight of at least one leveling agent, about 0.01% to about 0.08% by weight of at least one defoaming agent, about 0.01% to about 0.1% by weight of at least one biocide, and about 0.2% to about 2% by weight abrasive particulate solids having an average particle size in the range of about 0.5 to about 10 microns and a Knoop scale hardness of at least about 500.

In one embodiment a concentrate of the invention comprises at least one acrylic polymer, at least one synthetic wax, and particulate abrasive having an average particle size of up to about 100 microns.

The inventive compositions are formulated by blending or mixing the foregoing ingredients together using procedures well known in the art. The order of mixing is not critical, with the exception that the water, if present, is preferably introduced first and the particulate solids are preferably added last.

In one embodiment, the process for making inventive composition comprises: forming an emulsion comprising water and one or more of the foregoing acrylic polymers and synthetic waxes; then dispersing the abrasive particulates throughout the emulsion.

The following examples are provided for purposes of illustrating the invention. Unless otherwise indicated, in the following examples as well as throughout the specification and claims, all parts and percentages are by weight, all temperatures are in degrees centigrade, and all pressures are atmospheric.

EXAMPLES 1 AND 2

The following floor finish compositions are prepared by first placing the water in a mixing tank equipped with an agitator capable of forming a vortex. The agitator is activated and the vortex is formed. The ingredients indicated in the table below are then added with the Mirox-PL being added last. These compositions are water-oil emulsions with abrasive particulates dispersed therein. In the table below all numerical values are in parts by weight.

|  | Example 1 | Example 2 |
| --- | --- | --- |
| Water | 24.450 | 38.402 |
| Methyl Carbitol (product of Union Carbide identified as diethylene glycol monomethyl ether) | 6.027 | 4.611 |
| Tributoxy ethyl phosphate | 1.604 | 1.225 |
| Fluorad FC-129 (product of 3M Company identified as potassium fluorinated alkyl carboxylate) | 0.015 | 0.011 |
| SWS-211 (product of Wacker Silicones Corp. identified as a silicone defoaming agent) | 0.030 | 0.023 |
| Kathon CG/ICP (product of Rohm & Haas identified as 5-chloro-2-methyl-4-isothiazolin-3-one) | 0.040 | 0.039 |
| Intermediate R&H (acrylic polymer emulsion) | 42.957 | 32.850 |

| | Example 1 | Example 2 |
|---|---|---|
| Resinall 802 (product of Resinall Corp. identified as a malested rosin ester resin) | 16.547 | 12.220 |
| Alpine 9697 (product of Alpine Aromatics International identified as a fresh spice compounded fragrance) | 0.020 | 0.015 |
| Esi Cryl 325 (product of Emulsion Systems Inc. identified as a polyethylene emulsion) | 1.463 | — |
| Esi Cryl 43 (product of Emulsion Systems Inc. identified as a polyethylene emulsion) | — | 6.672 |
| Esi Cryl 252 (product of Emulsion Systems Inc. identified as a polyethylene emulsion) | 5.851 | 2.432 |
| Mirox-PL (product of Bernatex Corp. identified as aluminum oxide particulate having average particle size of 1.2–2.2 microns) | 1.000 | 1.500 |

The substrates that can be coated with the inventive compositions include floors and other surfaces on which a person or vehicle may travel. Examples include marble, clay tile, linoleum, Formica, ceramic, plastic, metal, wood, painted surfaces, waxed surfaces, polished surfaces, concrete and the like.

The inventive composition is used by applying it to a substrate, drying it to form a coating or film finish, and preferably buffing the coating or film finish to obtain the desired shine or luster. Preferably the inventive composition is agitated just before application to the substrate. The inventive composition is preferably in liquid form and as such may be applied to the substrate simply by pouring a desired amount on the substrate. Alternatively, the inventive composition may be applied to an applicator, which, in turn, is subsequently used to apply the inventive composition to the substrate. The inventive composition, after application, is permitted to dry on the substrate. The drying converts, through evaporation of water and other volatile ingredients, the inventive composition to a dried coating or film finish containing the abrasive particulates. The dried coating or film finish may be buffed to improve its shine or luster. In one embodiment, the inventive composition may be applied more than once to a surface to form multiple layers of dried coating or film finish. The abrasive particulates applied to the substrate with the inventive composition provide traction which increases the skid or slip resistance characteristics of the coated substrate as compared to a substrate coated with a conventional surface finish. Furthermore, traction of the dried coating or film finish can be maintained by polishing the covered surface sufficiently to grind away one or more layers that become worn, flattened, or coated with foreign matter.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A surface-finish composition, comprising: at least one acrylic polymer and an effective amount of abrasive particulates to provide said composition with enhanced non-slip characteristics, said abrasive particulates having an average particle size of up to about 100 microns.

2. The composition of claim 1 wherein said composition is a water-based composition.

3. The composition of claim 1 wherein said composition is an oil-based composition.

4. The composition of claim 1 wherein said composition further comprises at least one synthetic wax.

5. The composition of claim 1 wherein said composition further comprises water.

6. The composition of claim 1 wherein said composition further comprises water and at least one synthetic wax.

7. The composition of claim 1 further comprising at least one alkali-soluble resin.

8. The composition of claim 1 further comprising at least one leveling agent.

9. The composition of claim 1 further comprising at least one water-soluble solvent.

10. The composition of claim 1 further comprising at least one plasticizer.

11. The composition of claim 1 wherein said composition further comprises at least one defoaming agent.

12. The composition of claim 1 further comprising at least one fragrance enhancer.

13. The composition of claim 1 further comprising at least one biocide.

14. The composition of claim 1 wherein the at least one acrylic polymer comprises an acrylic or methacrylic acid or ester, acrylic homopolymer or copolymer, zinc-free acrylic polymer or copolymer, styrene acrylic copolymer, urethane-acrylic copolymer, or vinyl-acrylic copolymer.

15. The composition of claim 1 further comprising at least one synthetic wax, said wax being a polyalkylene.

16. The composition of claim 1 wherein said abrasive is crystalline silica, aluminum silica, titanium oxide, zinc oxide, topaz, aluminum oxide, silicon carbide, boron nitride, or a mixture of two or more thereof.

17. The composition of claim 1 wherein said abrasive has a Knoop scale hardness of at least about 500.

18. The composition of claim 1 wherein said abrasive is aluminum oxide with a Knoop scale hardness of at least about 1500 and an average particle size in the range of about 0.5 to about 10 microns.

19. An abrasive-containing surface-finish composition, comprising:
   about 10% to about 90% by weight water,
   about 1% to about 25% by weight of at least one acrylic polymer,
   about 0.5% to about 10% by weight of at least one synthetic wax,
   about 0.2% to about 5% by weight of at least one alkali-soluble resin,
   about 0.4% to about 10% by weight of at least one water-soluble solvent,
   about 0.8% to about 5% by weight of at least one plasticizer,
   about 0.001% to about 0.03% by weight of at least one leveling agent,
   about 0.01% to about 0.08% by weight of at least one defoaming agent,
   about 0.01% to about 0.1% by weight of at least one biocide, and
   about 0.2% to about 2% by weight abrasive particulate solids having an average particle size in the range of about 0.5 to about 10 microns and a Knoop scale hardness of at least about 500.

20. A concentrate for use in making an abrasive-containing surface-finish composition, comprising:
   at least one acrylic polymer,
   at least one synthetic wax, and particulate abrasive having an average particle size of up to about 100 microns.

21. A method of making a surface-finish composition, comprising:

forming an emulsion comprising water, at least one acrylic polymer and at least one synthetic wax; and dispersing particulate abrasive having an average particle size of up to about 100 microns in said emulsion.

* * * * *